United States Patent
Dubuc et al.

(10) Patent No.: US 7,486,735 B2
(45) Date of Patent: Feb. 3, 2009

(54) SUB-CARRIER ALLOCATION FOR OFDM

(75) Inventors: Christian Dubuc, Gatineau (CA); Colin Brown, Ottawa (CA); Daniel Boudreau, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 616 days.

(21) Appl. No.: 10/787,700

(22) Filed: Feb. 26, 2004

(65) Prior Publication Data

US 2004/0190640 A1 Sep. 30, 2004

Related U.S. Application Data

(60) Provisional application No. 60/451,127, filed on Feb. 28, 2003.

(51) Int. Cl.
*H04K 1/10* (2006.01)
*H04L 27/28* (2006.01)

(52) U.S. Cl. .................. 375/260; 375/295; 375/316; 370/206

(58) Field of Classification Search .......... 370/206, 370/210; 375/130, 132, 135, 136, 259–261, 375/267, 295, 298, 299, 316, 340, 347
See application file for complete search history.

(56) References Cited

U.S. PATENT DOCUMENTS

| | | | |
|---|---|---|---|
| 6,985,537 B1 * | 1/2006 | Milbar | 375/265 |
| 7,002,900 B2 * | 2/2006 | Walton et al. | 370/208 |
| 7,027,523 B2 * | 4/2006 | Jalali et al. | 375/296 |
| 7,039,001 B2 * | 5/2006 | Krishnan et al. | 370/203 |
| 2002/0136276 A1 * | 9/2002 | Franceschini et al. | 375/148 |
| 2002/0147017 A1 | 10/2002 | Li et al. | 455/447 |

FOREIGN PATENT DOCUMENTS

| | | |
|---|---|---|
| EP | 1014609 A1 | 6/2000 |
| EP | 1170917 A1 | 1/2002 |
| EP | 1267513 A2 | 12/2002 |

OTHER PUBLICATIONS

International Search Report for PCT/IB2004/000500, mailed Aug. 13, 2004.
Chen, Qingxin, Elvino S. Sousa, and Subbarayan Pasupathy, "Multicarrier CDMA with Adaptive Frequency Hopping for Mobile Radio Systems," IEEE Journal on Selected Areas in Communications, vol. 14, No. 9, Dec. 1996.

* cited by examiner

*Primary Examiner*—Jean B Corrielus
(74) *Attorney, Agent, or Firm*—Withrow & Terranova, P.L.L.C.

(57) ABSTRACT

The present invention divides the available sub-carriers in an OFDM symbol window into N groups of sub-carriers wherein each group will be associated with sub-bands. In one embodiment, the sub-carriers in a group are spread throughout the range of sub-carriers to improve frequency diversity, and the sub-carriers assigned to any one group are separated by a constant offset. The sub-carriers in the group may be offset by an integer power of two. Within each group, sub-bands are defined using frequency hopping patterns among sub-carriers in the group from one OFDM symbol window to another. A pseudo-random pattern may be employed for sub-carrier mapping from one OFDM symbol window to the next to effectively distribute the sub-bands across the selected band of sub-carriers for the group.

64 Claims, 8 Drawing Sheets

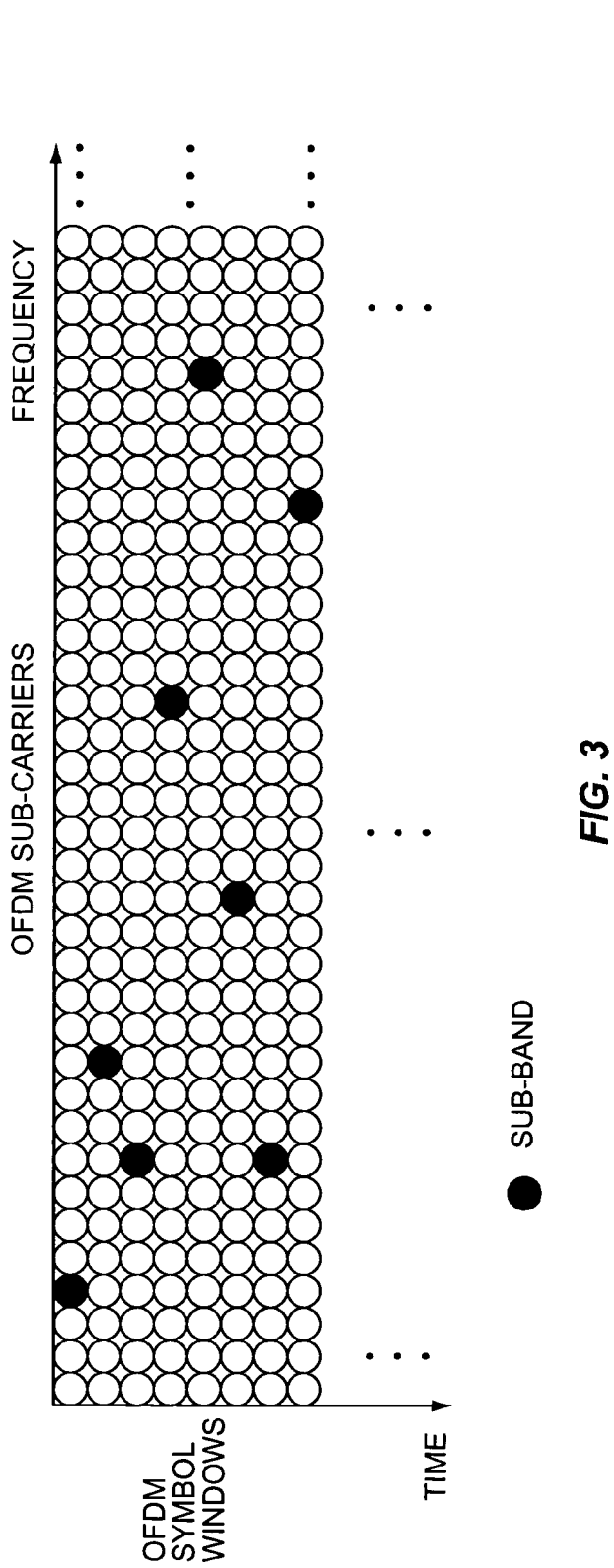

FIG. 5

SUB-CARRIER ALLOCATION FOR OFDM

This application claims the benefit of U.S. provisional application Ser. No. 60/451,127, filed Feb. 28, 2003, the disclosure of which is incorporated herein by reference in its entirety.

FIELD OF THE INVENTION

The present invention relates to wireless communications, and in particular to allocating sub-carriers in an orthogonal frequency division multiplexing system.

BACKGROUND OF THE INVENTION

Since orthogonal frequency division multiplexing (OFDM) is a multi-carrier transmission technique, the available spectrum is divided into many sub-carriers, each being modulated by data at a relatively low data rate. OFDM can support multiple access by allocating different sub-carriers to different users. The sub-carriers for OFDM are orthogonal and closely spaced to provide an efficient spectrum. Each narrow band sub-carrier is modulated using various modulation formats, such as quadrature phase-shift keying (QPSK) and quadrature amplitude modulation (QAM). OFDM modulation is provided using an Inverse Fast Fourier Transform (IFFT). Initially, data for transmission is mapped into quadrature-based symbols that are encoded onto the individual sub-carriers. An IFFT is performed on the set of modulated sub-carriers to produce an OFDM symbol in the time domain. Typically, a cyclic prefix is created and appended to the beginning of the OFDM symbol before it is amplified and transmitted. During reception, the OFDM symbols are processed using a fast Fourier transform (FFT) to recover the modulated sub-carriers, from which the transmitted symbols can be recovered and decoded to arrive at the transmitted data.

As noted, to facilitate multiple user access, data for transmission is allocated to groups of adjacent sub-carriers, wherein these groups remain consistent from one OFDM symbol to the next. With reference to FIG. 1, each circle represents a sub-carrier for a sequence of OFDM symbols. Each row represents the sub-carriers associated with an OFDM symbol, and each OFDM symbol is transmitted in sequence over time. In this example, users 1 and 2 require a voice service, wherein users 3 and 4 require data and video services, respectively. The voice services require lower data rate than the data services, while the video service requires the most resources. As such, the groups of sub-carriers dedicated to voice, such as that for users 1 and 2, are less than that for users 3 and 4. User 4 is using as much of the spectrum as the first three users combined. Notably, along the time-frequency plane for the OFDM spectrum, the mapping of user data to various sub-carriers is repetitive and consistent. Due to the significant variations in the communication channel, especially for the frequency selective fading channel, and interference over the time-frequency plane, such multiple access mapping results in a different carrier-to-interference ratio for each user. The different carrier-to-interference ratios will lead to unequal degradation of performance for each user.

In an effort to minimize the impact of the variations in the channel, frequency-hopping schemes have been employed to systematically remap the groups of sub-carriers associated with each user to different points in the time-frequency plane, as illustrated in FIG. 2. Thus, users are assigned one or more transmission blocks consisting of a set number of sub-carriers within a set number of adjacent OFDM symbols. Thus, a user does not necessarily transmit on the same sub-carrier group for every OFDM symbol, but will jump to a different sub-carrier after a period of time based on the defined hopping pattern. The sub-carrier hopping scheme illustrated in FIG. 2 improves the performance over the fixed time-frequency allocation illustrated in FIG. 1; however, the performance could be further improved if the diversity across the whole band were fully exploited.

Most solutions proposed to reduce the interference in frequency-hopped systems are based on the assumption that the different interfering transmitters are synchronized through a global positioning system (GPS) or the like. These solutions are not applicable to communication systems that are not synchronized, such as Universal Mobile Telecommunications System (UMTS).

Other frequency hopping schemes are based on non-synchronized transmitters, but they usually use different pseudo-random hopping sequences, with no way to discriminate the interference level for separate receivers. Hence, a receiver experiencing a low carrier-to-interference ratio will get the same probability of sub-carrier collisions as a receiver with a high carrier-to-interference ratio. This is not optimal, since the high-carrier-to-interference ratio receiver does not necessarily need to avoid collisions as much as a low carrier-to-interference ratio receiver. Thus, there is a need for an efficient sub-carrier mapping technique to minimize the impact of channel variations and interference over the time-frequency plane.

SUMMARY OF THE INVENTION

The present invention provides a frequency hopping technique for allocating sub-carriers in an OFDM environment to minimize the impact of channel variations and interference. In general, an OFDM symbol window relates to the time period in which an OFDM symbol is transmitted, and sub-bands are communication channels defined by a sequence of sub-carriers over multiple OFDM symbol windows. A sub-carrier for a given sub-band may hop from one OFDM symbol window to another. Thus, each sub-band is defined by a hopping pattern for sub-carriers over a sequence of OFDM symbol windows. One or more of these sub-bands may be assigned to a user for communications.

From one OFDM symbol window to the next, each sub-band is generally associated with a group of sub-carriers, which may or may not hop from one symbol to the next depending on the mapping scheme for frequency hopping. In operation, data for a given user is associated with one or more sub-bands, depending on the necessary throughput. The allocation of sub-bands to users may dynamically vary depending on the required throughput.

The present invention divides the available sub-carriers in an OFDM symbol into N groups of sub-carriers wherein each group will be associated with sub-bands using the sub-carriers for the group. In one embodiment, the sub-carriers in a group are spread throughout the range of sub-carriers to improve frequency diversity. For maximum frequency diversity, the sub-carriers assigned to any one group are separated by a constant offset.

To minimize the complexity of demodulation using a fast Fourier transform techniques, the sub-carriers in the group are offset by a power of two ($2^x$, x being an integer). When each group has $2^x$ sub-carriers that are equally spaced, a subset fast Fourier transform (FFT) can be applied to extract only the sub-carriers in the desired group during reception. The subset FFT reduces the computational complexity associated with a full range FFT capable of operating over the entire OFDM symbol to recover each of the sub-carriers associated with the entire OFDM symbol, instead of just those associated with the group.

Within each group, sub-bands are defined using frequency hopping patterns among sub-carriers in the group from one OFDM symbol window to another. A pseudo-random pattern may be employed for sub-carrier mapping from one OFDM symbol window to the next to effectively distribute the sub-bands across the selected band of sub-carriers for the group.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 is a time-frequency plan illustrating frequency hopping.

FIG. 4 illustrates a preferred process for allocating sub-carriers according to one embodiment of the present invention.

Figure 5:
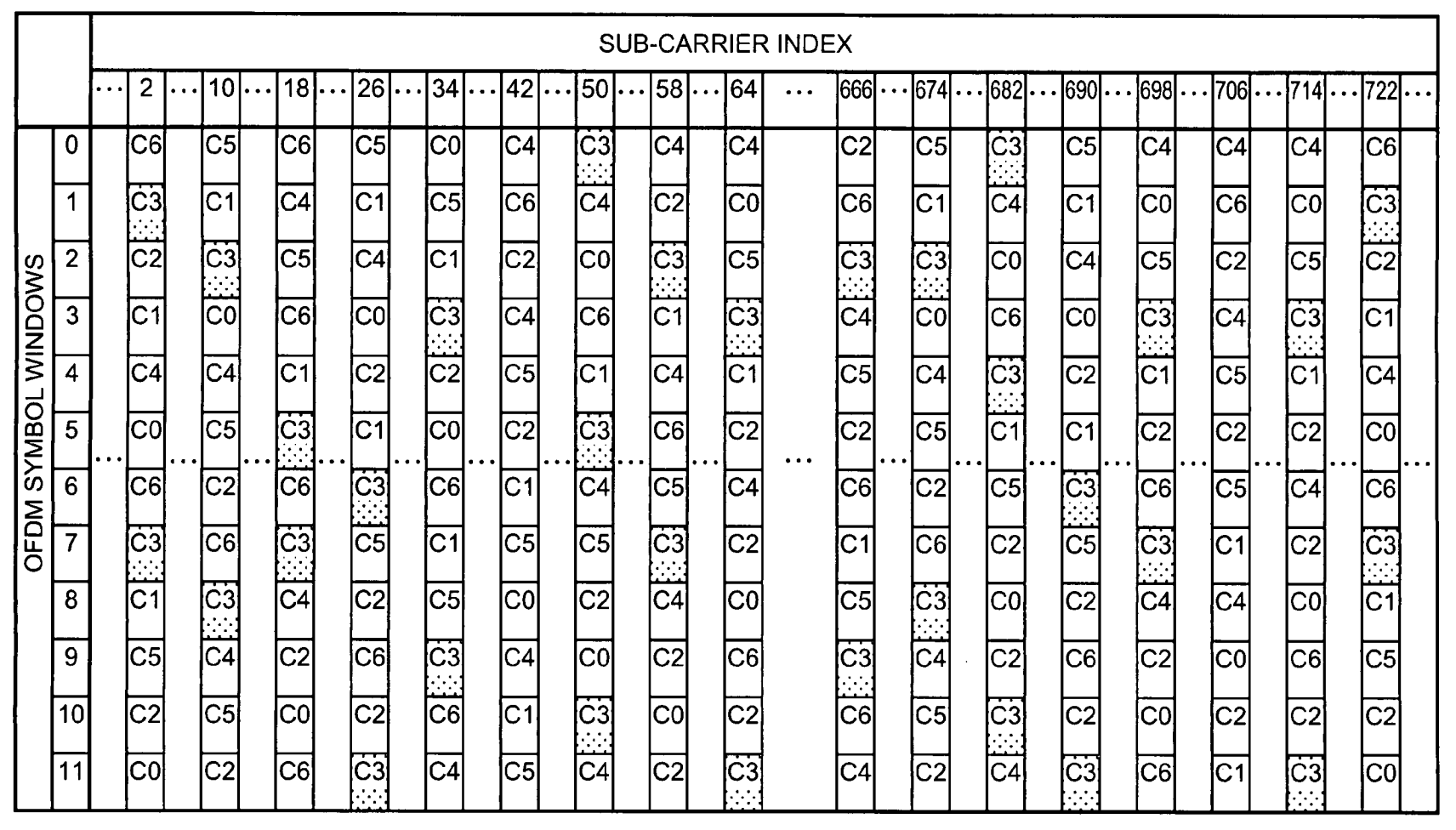

FIG. 5 is a sub-band indexing plan according to one embodiment of the present invention.

DETAILED DESCRIPTION OF THE PREFERRED EMBODIMENTS

Figure 1:
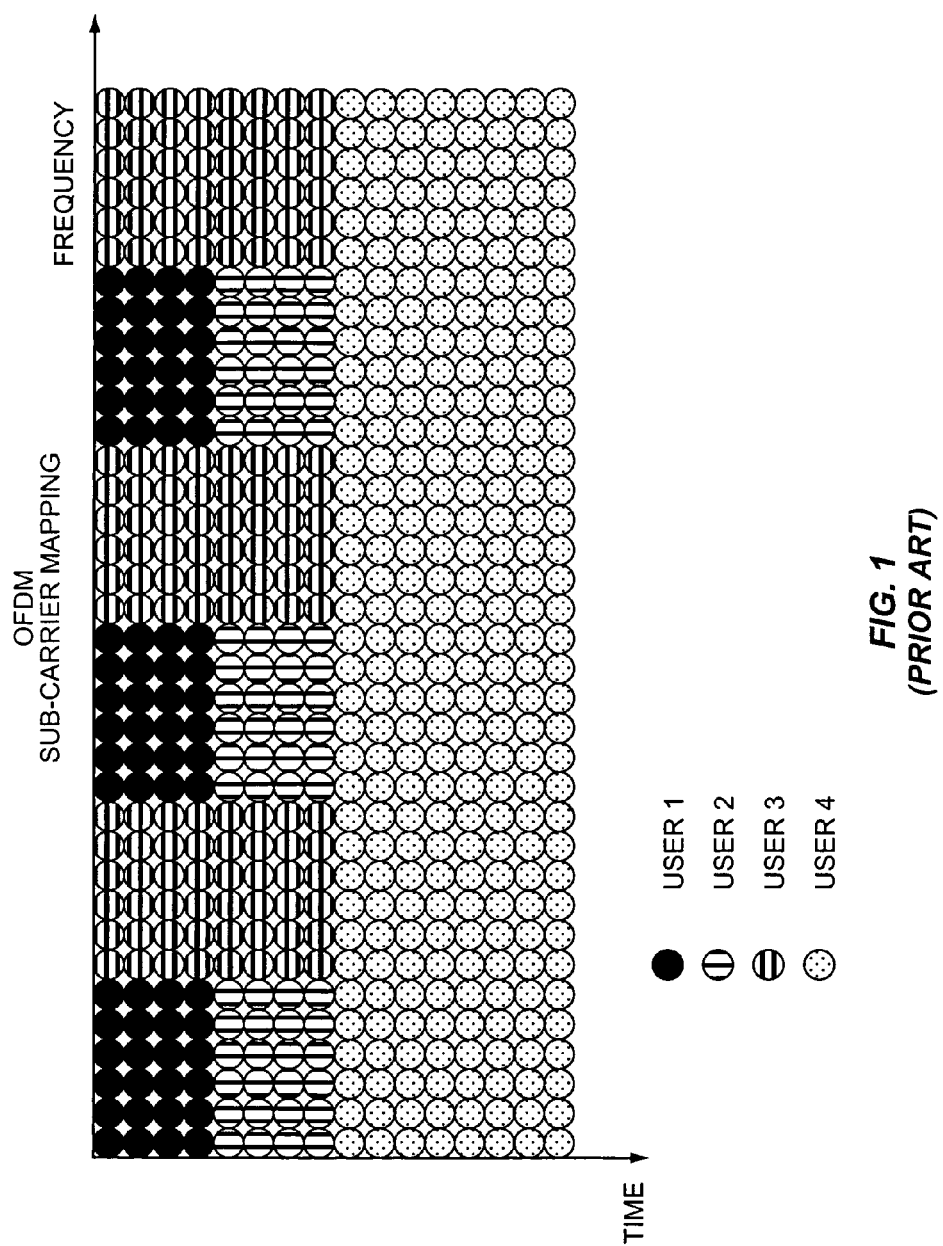
FIG. 1 is an OFDM time-frequency plan according to one prior art embodiment.
Figure 2:
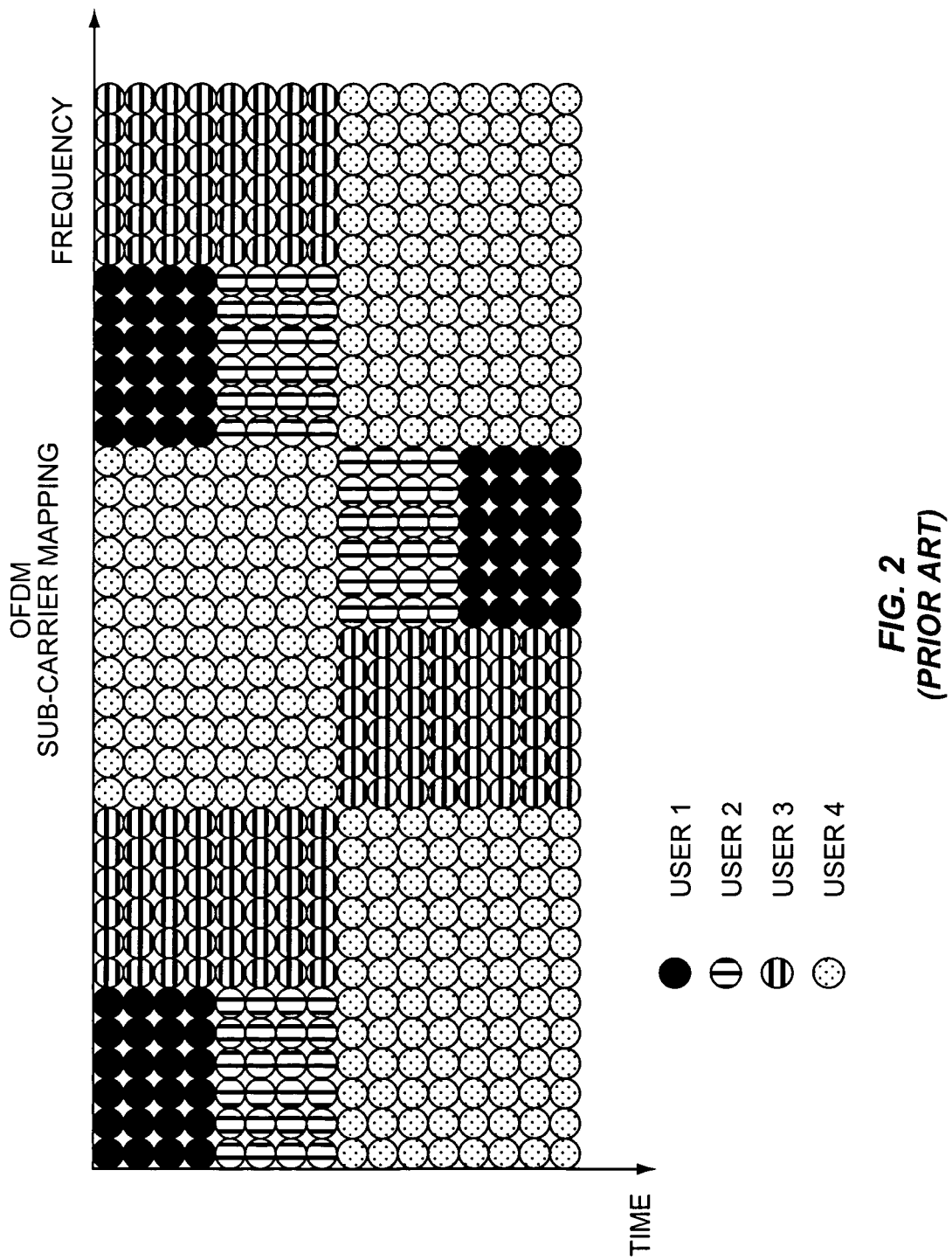
FIG. 2 is an OFDM time-frequency plan according to a second prior art embodiment.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for allocating sub-carriers in an OFDM environment to minimize the impact of channel variations and interference. With reference to FIG. 3, an exemplary time-frequency plan in an OFDM spectrum is illustrated. Each row represents the available sub-carriers associated with a given OFDM symbol being transmitted over an OFDM symbol window. An OFDM symbol window relates to the time period in which an OFDM symbol is transmitted. A sub-band is a communication channel defined by a sequence of sub-carriers over multiple OFDM symbol windows. As illustrated by the darkened circles, a sub-carrier for a given sub-band may hop from one OFDM symbol window to another. Thus, the sub-band is defined by a hopping pattern for sub-carriers over a sequence of OFDM symbol windows. One or more of these sub-bands may be assigned to a user for communications. Although not illustrated, there may be multiple sub-carriers for a given sub-band.

From one OFDM symbol window to the next, each sub-band is generally associated with a group of sub-carriers, which may or may not hop from one symbol to the next depending on the mapping scheme for frequency hopping. In operation, data for a given user is associated with one or more sub-bands, depending on the necessary throughput. The allocation of sub-bands to users may dynamically vary depending on the required throughput.

In the one embodiment, the available sub-carriers in an OFDM symbol window are divided into N groups of sub-carriers wherein the sub-carriers in a group are spread throughout the range of sub-carriers to improve frequency diversity. FIG. 4 illustrates an exemplary scenario where there are 729 sub-carriers indexed as sub-carriers 0 through 728 divided into eight groups (N=8), which are referenced A through H. The sub-carriers for group C are highlighted. For maximum frequency diversity, the sub-carriers assigned to any one group are separated by a constant offset. Further, the sub-carriers for one group will not form part of another group.

To minimize the complexity of demodulation using a fast Fourier transform techniques, the sub-carriers in the group are offset by a power of two ($2^x$, x being an integer). When each group has $2^x$ sub-carriers that are equally spaced, a subset fast Fourier transform (FFT) can be applied to extract only the sub-carriers in the desired group during reception. The subset FFT reduces the computational complexity associated with a full range FFT capable of operating over the entire OFDM symbol to recover each of the sub-carriers associated with the entire OFDM symbol, instead of just those associated with the group.

Thus, to maximize frequency diversity and minimize demodulation complexity, the number of groups will be a power of two. In the illustrated example, $N=2^3=8$. The groups $\Gamma_i$ are defined as the following sets of sub-carriers:

$\Gamma_A=\{0, 8, 16, \ldots, 720, 728\}$ $\Gamma_B=\{1, 9, 17, \ldots, 721\}$ $\Gamma_C=\{2, 10, 18, \ldots, 722\}$ $\Gamma_D=\{3, 11, 19, \ldots, 723\}$ $\Gamma_E=\{4, 12, 20, \ldots, 724\}$ $\Gamma_F=\{5, 13, 21, \ldots, 725\}$ $\Gamma_G=\{6, 14, 22, \ldots, 726\}$ $\Gamma_H=\{7, 15, 23, \ldots, 727\}$ Within each group, sub-bands are defined using frequency hopping patterns among sub-carriers in the group from one OFDM symbol window to another. For group C, an example is provided in FIG. 5 wherein a pseudo-random pattern is employed for sub-carrier mapping from one OFDM symbol window to the next to effectively distribute eight sub-bands (C0 through C7) across the selected band of sub-carriers of group C. The other groups A, B, and D through H may be configured in a similar manner.

The number of sub-carriers per sub-band is M and can be fixed or variable. If fixed, then M establishes the number of sub-carriers for each sub-band, and for the above example, M is equal to 729/(N×L)], where L is the number of sub-bands per group and N is the number of groups. For instance, if N=8 and L=7, M=13.

For each group $\Gamma_i$, a number of sub-bands $S_{i,j}$ within an OFDM symbol are assigned randomly using a scrambling code seed α, obtained through an appropriate synchronisation scheme, which allows communicating devices to arrive at the same frequency hopping pattern. The set of permuted (or interleaved) indexes $\Pi_{i,k}$ defining the hopping pattern for group $\Gamma_i$ is defined as:

$$\Pi_{i,k}=P(\Gamma_i, \alpha, k)$$

where k is the OFDM symbol (window) number (0-11 for FIG. 5) in a Transmit Time Interval (TTI), and P is a pseudo-random permutation function.

For a fixed value of sub-carriers per sub-band (M), the frequency hopped set of sub-carriers in sub-band $S_{i,j}$ for the $k^{th}$ OFDM symbol in the TTI can be expressed as:

$$S_{i,j}(k)=\{\Pi_{i,k}(M*j),\Pi_{i,k}(M*j+1),K,\Pi_{i,k}(M*j+M-1)\}$$

where $\Pi_{i,k}(n)$ is the $n^{th}$ element of the permuted index set $\Pi_{i,k}$, with n={0, ..., floor(729/N)). Note that the total number of sub-carriers in sub-band $S_{i,j}$(k) for symbol k is M, and the total number of sub-carriers allocated to sub-band $S_{i,j}$ in a TTI is 12×M.

For a variable value of M, that is M(i,j), the frequency hopped set of sub-carriers in sub-band $S_{i,j}$ for the $k^{th}$ OFDM symbol in the 2 ms TTI can be expressed as:

$$S_{i,j}(k)=\{\Pi_{i,k}[W(i,j)],\Pi_{i,k}[W(i,j)+1],K,\Pi_{i,k}[W(i,j)+M(i,j)-1]\}$$

with $$W(i,j)=W(i,j-1)+M(i,j-1).$$

Note that in this case the total number of sub-carriers in sub-band $S_{i,j}$(k) for symbol k is M(i,j), and the total number of sub-carriers allocated to sub-band $S_{i,j}$ in a TTI is 12×M(i,j).

In operation, various types of information are transmitted between communicating devices. The information may include pilot signals, control signaling, and traffic, which may represent traditional data, audio, video, or voice. In one embodiment, the pilot signals and control signalling for a sector or cell can be confined to one of the N groups. For a group containing pilot signals and control signals, only the unused sub-carriers may be assigned for the traffic carrying sub-bands.

When assigning groups and sub-bands for communications, various factors may be taken into consideration. For example, the number of sub-carriers and sub-bands may vary on the desired throughput or the time sensitivity of the traffic being transmitted. The allocation of sub-carriers into sub-bands and groups allows enhanced traffic scheduling as well as handoffs from one access point, such as a cellular base station, to another. With regard to scheduling, the various groups defined for the OFDM spectrum may be allocated to different sectors in different ways. For example, certain groups may be used by every sector in every cell, regardless of whether the sectors or cells are adjacent to one another. Other groups can be reserved for select sectors, preferably those that are not adjacent to sectors using the same group. Thus, certain groups will be isolated from one another in the communication environment. For example, mobile terminals communicating with base stations may report channel conditions associated with the data being received back to the base station. These channel conditions may be measured or estimated in a number of ways known to those skilled in the art, and often relate to the carrier-to-interference ratio.

Over time, the base stations or an appropriate scheduling entity therefor can gather information on a relatively long-term basis to determine the average channel conditions for each mobile terminal. If the channel conditions are acceptable, the scheduling entity may assign a mobile terminal to a group that is also used in other sectors or cells. In essence, since the channel conditions are acceptable, the mobile terminal is deemed to be able to handle a higher-interference environment and is thus placed in a group that is used by multiple and potentially adjacent sectors or cells. If the channel conditions are poor for a particular user, the scheduler may assign the user to a sub-band in a group that is not used in adjacent sectors or cells. In such a group, there will be less interference since the group is not reused in adjacent sectors or cells, and the channel conditions will invariably improve. This type of scheduling takes place at a relatively slow rate, and will allow users to gravitate towards an acceptable carrier-to-interference ratio.

The scheduling of traffic for a particular user within a group may be based on the reported channel conditions for that particular group. The mobile terminal may monitor and report only channel conditions related to the group, and the scheduler may only take into consideration those measurements for scheduling traffic in the group. Accordingly, processing is reduced by only taking into consideration the channel conditions for an associated group. As such, channel conditions for other groups in the given sector or cell do not have to be considered for normal traffic scheduling within a group. Scheduling may be configured to take advantage of the best channel conditions, or may use the channel conditions to assure a certain quality of service for all users within the group.

For handoffs from one sector or cell to another, a user may be assigned a first sub-band in a first group of a first base station, and a second sub-band of a second group for a second base station. The mobile terminal will then communicate during the soft handoff using the first and second sub-bands of the first and second groups until the handoff is complete. Those skilled in the art will recognize additional benefits of the sub-carrier allocation techniques of the present invention.

An exemplary architecture for implementing the above concepts is illustrated below. Those skilled in the art will recognize the various modifications and changes from that described below that are still within the scope of the teachings herein and the claims that follow.

Figure 6:
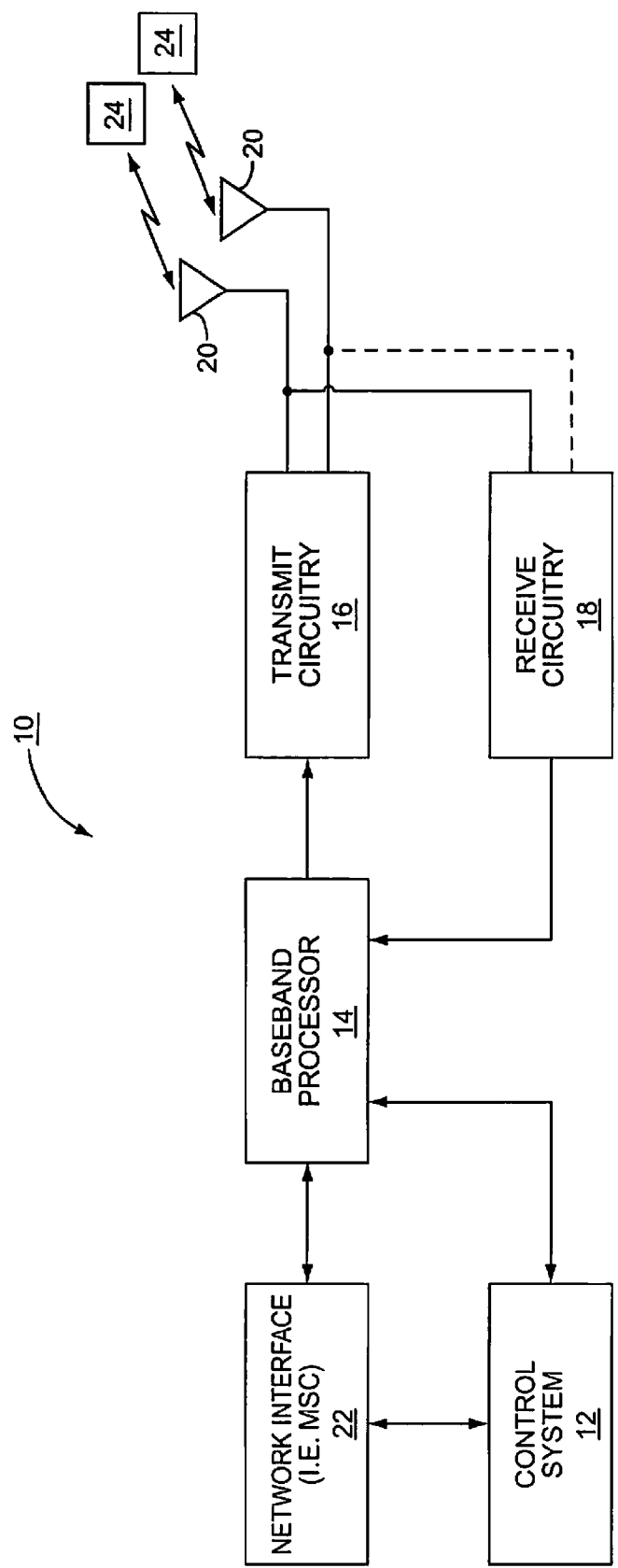
FIG. 6 is a block representation of a base station according to one embodiment of the present invention.

With reference to FIG. 6, a base station 10 configured according to one embodiment of the present invention is illustrated. The base station 10 generally includes a control system 12, a baseband processor 14, transmit circuitry 16, receive circuitry 18, multiple antennas 20, and a network interface 22. The receive circuitry 18 receives radio frequency signals bearing information from one or more remote transmitters provided by user elements 24, such as mobile telephones, personal digital assistants, wireless modems, and the like (illustrated in FIG. 7).

The baseband processor 14 processes the digitized received signal signals from the receive circuitry 18 to extract the information or data bits conveyed in the received signal. This processing typically comprises OFDM demodulation, decoding, and error correction operations. As such, the baseband processor 14 is generally implemented in one or more digital signal processors (DSPs). The received information, such as pilot signals, control signals, traffic, and channel condition indicia, is then sent across a wireless network via the network interface 22 or transmitted to another user element 24 serviced by the base station 10. The network interface 22 will typically interact with a circuit-switched network forming a part of a wireless network, which may be coupled to the public switched telephone network (PSTN). For example, the network interface 22 may communicate with a mobile switching center (MSC) servicing multiple base stations 10.

On the transmit side, the baseband processor 14 receives digitized data, which may represent voice, data, or control information, from the network interface 22 under the control of control system 12. The baseband processor 14 encodes the data for transmission. The encoded data is output to the transmission circuitry 16 for OFDM modulation. A power amplifier (not shown) will amplify the modulated OFDM signals to a level appropriate for transmission, and deliver the modulated carrier signal to the antennas 20 through a matching network (not shown). Modulation and processing details are described in greater detail below.

Figure 7:
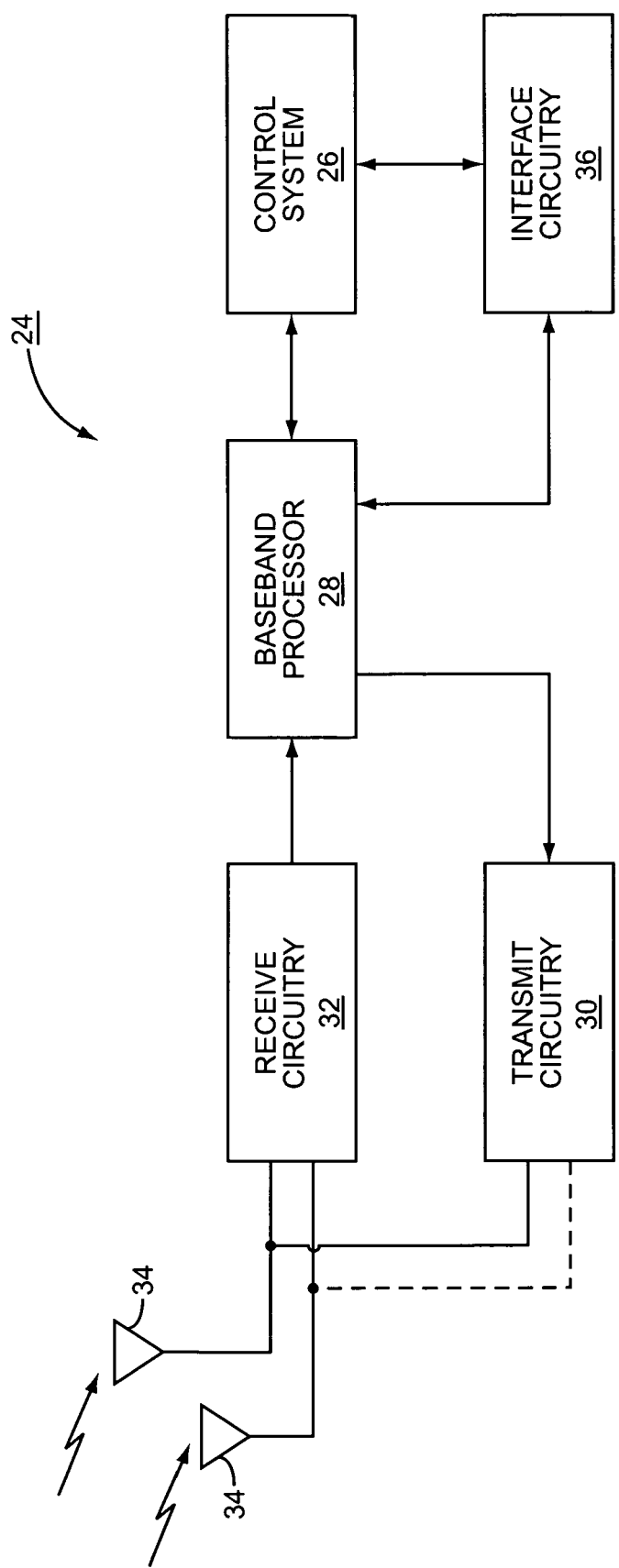
FIG. 7 is a block representation of a user element according to one embodiment of the present invention.

With reference to FIG. 7, a user element 24 configured according to one embodiment of the present invention is illustrated. Similarly to the base station 10, the user element 24 will include a control system 26, a baseband processor 28, transmit circuitry 30, receive circuitry 32, multiple antennas 34, and user interface circuitry 36. The receive circuitry 32 receives OFDM frequency signals bearing information from one or more remote transmitters provided by base stations 10. Preferably, a low noise amplifier and a filter (not shown) cooperate to amplify and remove broadband interference from the signal for processing. The baseband processor 28 processes the digitized received signal to extract the information or data bits conveyed in the received signal. This processing typically comprises demodulation using a Fast Fourier Transform, decoding, and error correction operations as will be discussed on greater detail below. The baseband processor 28 is generally implemented in one or more digital signal processors (DSPs). During reception, channel condition indicia may be monitored for feedback to the base station 10. In one embodiment, the channel condition information may be related to a carrier-to-interference ratio.

For transmission, the baseband processor 28 receives digitized traffic, which may represent audio, video, voice, data, pilot signals, or control information, from the control system 26, which it encodes for transmission. The encoded data is output to the transmit circuitry 30, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 34 through a matching network (not shown).

The present operation uses OFDM in a communication system, which may incorporate spatial diversity. OFDM modulation generally relies on the performance of an Inverse Fast Fourier Transform (IFFT) on the symbols to be transmitted. For demodulation, the performance of a Fast Fourier Transform (FFT) on the received signal is used to recover the transmitted symbols. In practice, an Inverse Discrete Fourier Transform (IDFT) and Discrete Fourier Transform (DFT) are implemented using digital signal processing for modulation and demodulation, respectively.

In the preferred embodiment, OFDM is used at least for the downlink transmission from the base stations 10 to the user elements 24. Further, the base stations 10 are synchronized to a common clock. Each base station 10 is equipped with n transmit antennas 20, and each user element 24 is equipped with m receive antennas 34. Notably, the respective antennas can be used for reception and transmission using appropriate duplexers or switches and are so labeled only for clarity.

Figure 8:
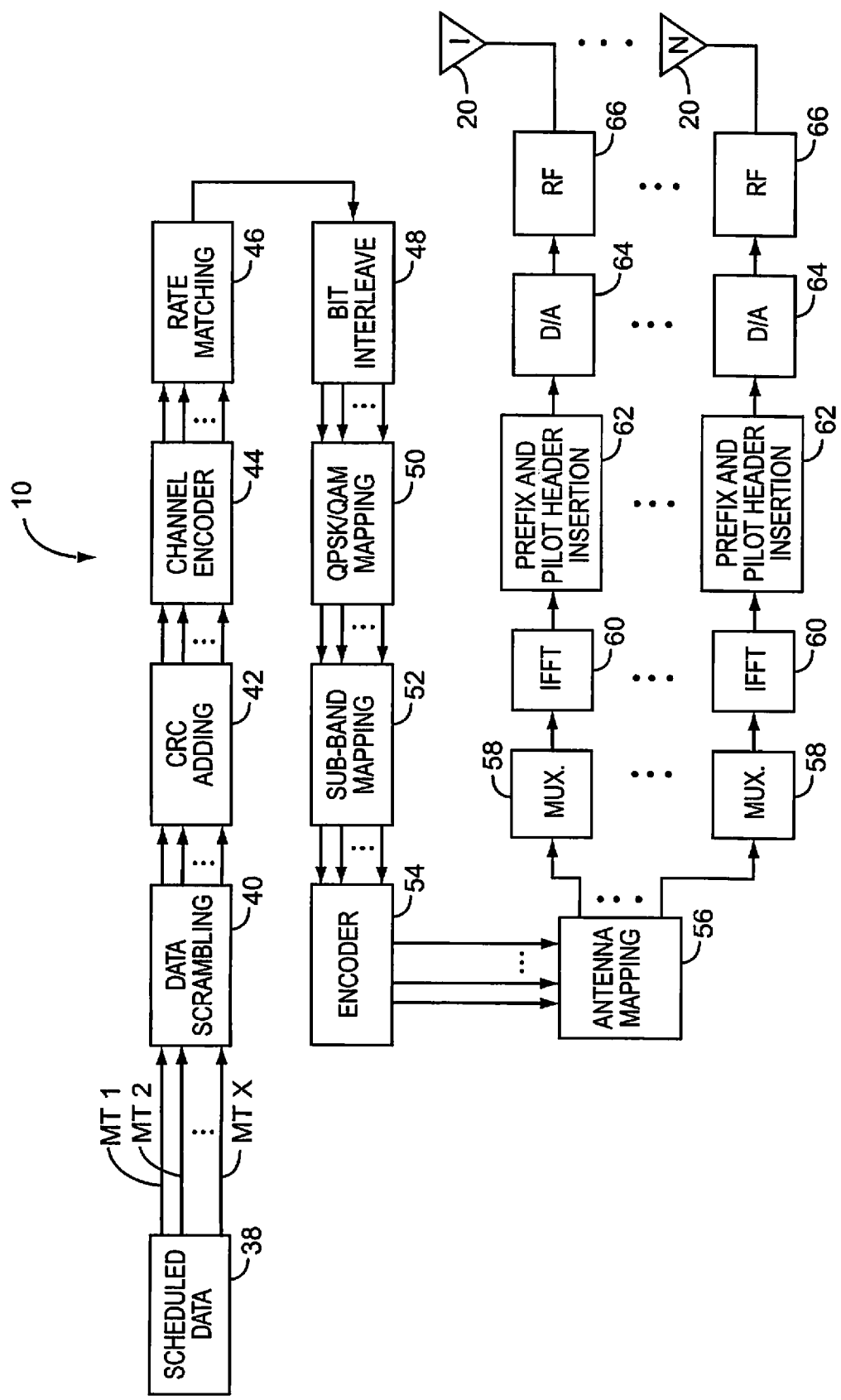
FIG. 8 is a logical representation of a transmitter according to one embodiment of the present invention.

With reference to FIG. 8, a logical transmission architecture is provided according to one embodiment. In this embodiment, the base station 10 and user element 24 (FIG. 7) have multiple antennas; however, those skilled in the art will recognize the applicability of the present invention to less complicated, single-antennas embodiments. Further, the transmission architecture is described as being that of the base station 10, but those skilled in the art will recognize the applicability of the illustrated architecture for uplink and downlink communications. Initially, a base station controller (not shown) sends data in the form of a series of data bits intended for multiple user elements 24 (users 1 through X) to the base station 10. The base station 10 will schedule the data for transmission during select time slots. The scheduled data bits 38 for each user element 24 are preferably scrambled in a manner reducing the peak-to-average power ratio associated with the bit stream using data scrambling logic 40. A cyclic redundancy check (CRC) for the scrambled bits is determined and appended to portions of the scrambled bits using CRC adding logic 42. Next, channel coding is performed using channel encoder logic 44 to effectively add redundancy to the groups of bits to facilitate recovery and error correction at the user element 24. The channel encoder logic 44 uses known Turbo encoding techniques in one embodiment. The encoded data is then processed by rate matching logic 46 to compensate for the data expansion associated with encoding.

Bit interleaver logic 48 systematically reorders the bits in the encoded data to minimize the potential for loss of consecutive bits during transmission. Based on the desired modulation, which is preferably Quadrature Amplitude Modulation (QAM) or Quadrature Phase Shift Key (QPSK) modulation, groups of the bits are systematically mapped into corresponding symbols by the QPSK/QAM mapping logic 50. The symbols may be systematically reordered to further bolster the immunity of the transmitted signal to periodic data loss caused by frequency selective fading. Next, the symbols for each user are each encoded onto sub-carriers for an appropriate sub-band and group according to a defined index by sub-band mapping logic 52 as above described. Accordingly, the symbols for a select user element 24 are encoded onto sub-carriers into one or more sub-bands assigned to the user element 24.

If space-time coding (STC) is employed, symbols on each sub-carrier may be presented to optional STC encoder logic 54, which processes blocks of symbols to modify the symbols in a fashion making the transmitted signals more resistant to interference and readily decoded at a user element 24 or to enhance spectrum efficiency. The STC encoder logic 54 will process the incoming symbols according to a selected STC encoding mode and provide n outputs, which may corresponding to the number of transmit antennas 20 for the base station 10. For further detail, see A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

Regardless of STC encoding, the modulated sub-carriers may be selectively directed along a transmission path associated with a desired one of the antennas 20 by antenna mapping logic 56. The antenna mapping logic 56 may facilitate spatial hopping for each user element 24 by pseudo-randomly changing the antenna 20 used to transmit the modulated sub-carriers for any given user element 24.

Multiplexing logic 58 cooperates with the antenna mapping logic 56 to associate and combine sub-carriers for any of the given user elements 24 for processing by IFFT logic 60. For each transmission path, there is a group of sub-carriers. The IFFT logic 60 will perform some form of inverse Fast Fourier Transform, such as an Inverse Discrete Fast Fourier Transform (IDFT), to produce an OFDM symbol in the time domain. The OFDM symbol will include the frequency components of each of the modulated sub-carriers for a given time period. Generally, the length of time for the OFDM symbol is equal to the reciprocal of the spacing of the sub-carriers, and is relatively long compared to the data rate associated with the incoming data bits.

After IFFT processing, a cyclic prefix and pilot headers are added to the beginning of the OFDM symbols by prefix and pilot header insertion logic 62. The resultant signals are converted to an analog signal via digital-to-analog (D/A) conversion circuitry 64. The resultant analog signals are then simultaneously amplified, and transmitted via radio frequency (RF) circuitry 66 to the respective antennas 20 in the corresponding transmission path.

Figure 9:
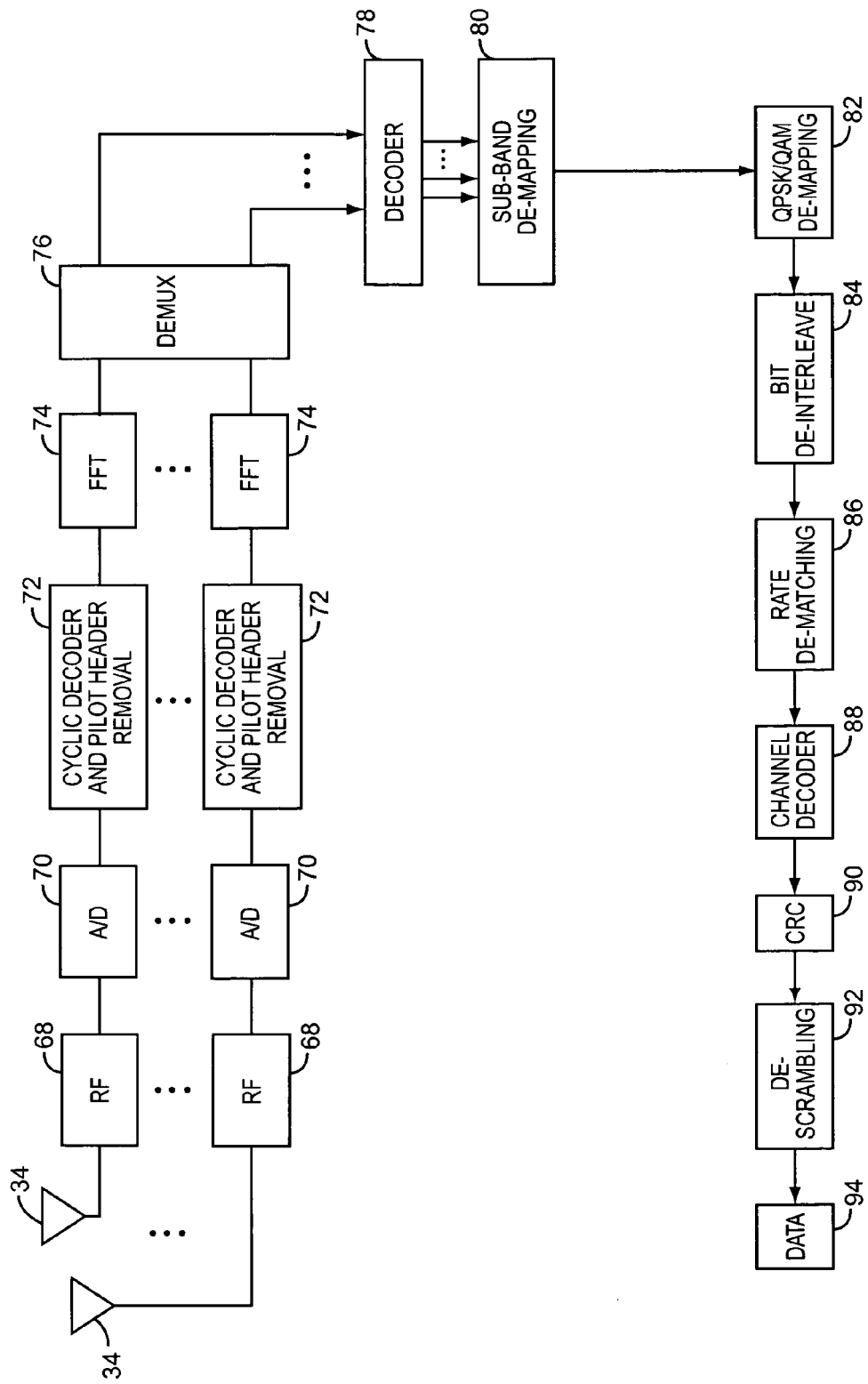
FIG. 9 is a logical representation of a receiver according to one embodiment of the present invention.

Reference is now made to FIG. 9. Upon arrival of the transmitted signals at each of the antennas 34 of the user element 24, the signals are downconverted and amplified by RF receive circuitries 68. Analog-to-digital (A/D) converters 70 then digitize these analog signals for digital processing. The cyclic prefixes and pilot headers are removed by the cyclic decoder and pilot header removal logic 72. Respective FFT processors 74 operate to facilitate a Fast Fourier Transform on the digitized signals to convert the received time domain OFDM symbols into a group of modulated sub-carriers in the frequency domain. Preferably, a subset FFT is performed to recover only those sub-carriers carrying information that is intended for the user element 24. Since the sub-carriers carrying such data will change from symbol to symbol based on the sub-band indexing, the FFT logic may synchronously change processing from one OFDM symbol to another within the defined group. The subset FFT is preferably accomplished using a Discrete Fourier Transform. Demultiplexing logic 76 combines the sub-carriers from each of the receive paths and presents the recovered sub-carriers to an STC decoder 78, if space-time coding was employed during transmission. The STC decoder 78 implements STC decoding on the symbols in the sub-carriers.

Regardless of STC decoding, the recovered set of sub-carriers is sent to sub-band de-mapping logic 80, which will de-map the symbols from the respective sub-carriers for delivery to QPSK/QAM de-mapping logic 82. The de-mapped symbols are converted to a corresponding bitstream using QPSK/QAM de-mapping logic 82. The bits are then de-interleaved using bit de-interleaver logic 84, which corresponds to the bit interleaver logic 48 of the transmitter architecture. The de-interleaved bits are then processed by rate de-matching logic 86 and presented to channel decoder logic 88 to recover the initially scrambled data and the CRC checksum. Accordingly, CRC logic 90 removes the CRC checksum, checks the scrambled data in traditional fashion, and provides it to the de-scrambling logic 92 for de-scrambling using the known base station de-scrambling code to recover the originally transmitted data 94.

Those skilled in the art will recognize improvements and modifications to the preferred embodiments of the present invention. All such improvements and modifications are considered within the scope of the concepts disclosed herein and the claims that follow.

What is claimed is:

1. A method for communicating in an orthogonal frequency division multiplexing (OFDM) environment comprising:
   a) associating traffic to be transmitted to a plurality of user elements with corresponding sub-bands, each sub-band defined by a sequence of sub-carriers over a plurality of OFDM symbol windows, the sub-carriers for each sub-band associated with one of a plurality of groups of sub-carriers within an OFDM frequency band;
   b) mapping the traffic into quadrature-based symbols;
   c) for each of the user elements, encoding the quadrature-based symbols onto the sub-carriers for the sub-band associated with the user element; and
   d) modulating the sub-carriers using an Inverse Fast Fourier Transform to create OFDM symbols for transmission.

2. The method of claim 1 wherein the sub-carriers associated with each of the plurality of groups of sub-carriers are spread over the OFDM frequency band.

3. The method of claim 1 wherein the sub-carriers associated with each of the plurality of groups of sub-carriers are separated by a constant offset.

4. The method of claim 3 wherein the constant offset is equal to a number of the plurality of groups.

5. The method of claim 3 wherein the constant offset is equal to $2^x$, wherein x is an integer.

6. The method of claim 1 wherein pilot signals and control signals are confined to certain of the plurality of groups of sub-carriers.

7. The method of claim 6 wherein the traffic is carried on sub-carriers not used for either the pilot signals or the control signals within the certain of the plurality of groups of sub-carriers.

8. The method of claim 1 wherein each sub-band is further defined by a frequency hopping pattern of sub-carriers within a given one of the plurality of groups of sub-carriers from one OFDM symbol window to another.

9. The method of claim 8 wherein the frequency hopping pattern is pseudo random.

10. The method of claim 1 wherein each of the plurality of groups of sub-carriers supports a plurality of sub-bands.

11. The method of claim 1 wherein at least one of the sub-bands is defined by a plurality of the sub-carriers during an OFDM symbol window within one of the plurality of OFDM symbol windows.

12. The method of claim 1 wherein the user elements are associated with a group of sub-carriers based on channel conditions.

13. The method of claim 1 wherein a first set of the plurality of groups of sub-carriers is used by adjacent sectors or cells, and a second set of the plurality of groups of sub-carriers is not used by adjacent sectors or cells.

14. The method of claim 13 wherein user elements experiencing poor channel conditions are associated with a sub-band in the second set of the plurality of groups of sub-carriers.

15. The method of claim 13 wherein user elements experiencing good channel conditions are associated with a sub-band in the first set of the plurality of groups of sub-carriers.

16. The method of claim 1 wherein during a handoff from a first access point to a second access point, the user element is associated with a first sub-band for the first access point and a second sub-band for the second access point.

17. A method for communicating in an orthogonal frequency division multiplexing (OFDM) environment comprising:

a) receiving OFDM symbols, the OFDM symbols carrying traffic for a user element in a sub-band defined by a sequence of sub-carriers over a plurality of OFDM symbol windows, the sub-carriers for the sub-band associated with one of a plurality of groups of sub-carriers within an OFDM frequency band;

b) demodulating the OFDM symbols using a Fourier Transform to recover sub-carriers encoded with quadrature-based symbols; and c) decoding the quadrature-based symbols encoded onto the sub-carriers to recover the traffic for the user element.

18. The method of claim 17 wherein the sub-carriers associated with each of the plurality of groups of sub-carriers are spread over the OFDM frequency band.

19. The method of claim 17 wherein the sub-carriers associated with each of the plurality of groups of sub-carriers are separated by a constant offset.

20. The method of claim 19 wherein the constant offset is equal to a number of the plurality of groups.

21. The method of claim 19 wherein the constant offset is equal to $2^x$, wherein x is an integer.

22. The method of claim 17 wherein pilot signals and control signals are confined to certain of the plurality of groups of sub-carriers.

23. The method of claim 22 wherein the traffic is carried on sub-carriers not used for either the pilot signals or the control signals within the certain of the plurality of groups of sub-carriers.

24. The method of claim 17 wherein each sub-band is further defined by a frequency hopping pattern of sub-carriers within a given one of the plurality of groups of sub-carriers from one OFDM symbol window to another.

25. The method of claim 24 wherein the frequency hopping pattern is pseudo random.

26. The method of claim 17 wherein each of the plurality of groups of sub-carriers supports a plurality of sub-bands.

27. The method of claim 17 wherein at least one of the sub-bands is defined by a plurality of the sub-carriers during an OFDM symbol window within one of the plurality of OFDM symbol windows.

28. The method of claim 17 wherein the user elements are associated with a group of sub-carriers based on channel conditions.

29. The method of claim 17 wherein a first set of the plurality of groups of sub-carriers is used by adjacent sectors or cells, and a second set of the plurality of groups of sub-carriers is not used by adjacent sectors or cells.

30. The method of claim 29 wherein user elements experiencing poor channel conditions are associated with a sub-band in the second set of the plurality of groups of sub-carriers.

31. The method of claim 29 wherein user elements experiencing good channel conditions are associated with a sub-band in the first set of the plurality of groups of sub-carriers.

32. The method of claim 17 wherein during a handoff from a first access point to a second access point, the user element is associated with a first sub-band for the first access point and a second sub-band for the second access point.

33. A system for communicating in an orthogonal frequency division multiplexing (OFDM) environment comprising:
  a) wireless communication electronics; and
  b) control system associated with the wireless communication electronics and adapted to:
    i) associate traffic to be transmitted to a plurality of user elements with corresponding sub-bands, each sub-band defined by a sequence of sub-carriers over a plurality of OFDM symbol windows, the sub-carriers for each sub-band associated with one of a plurality of groups of sub-carriers within an OFDM frequency band;
    ii) map the traffic into quadrature-based symbols;
    iii) for each of the user elements, encode the quadrature-based symbols onto the sub-carriers for the sub-band associated with the user element; and
    iv) modulate the sub-carriers using an Inverse Fourier Transform to create OFDM symbols for transmission.

34. The system of claim 33 wherein the sub-carriers associated with each of the plurality of groups of sub-carriers are spread over the OFDM frequency band.

35. The system of claim 33 wherein the sub-carriers associated with each of the plurality of groups of sub-carriers are separated by a constant offset.

36. The system of claim 35 wherein the constant offset is equal to a number of the plurality of groups.

37. The system of claim 35 wherein the constant offset is equal to $2^x$, wherein x is an integer.

38. The system of claim 33 wherein pilot signals and control signals are confined to certain of the plurality of groups of sub-carriers.

39. The system of claim 38 wherein the traffic is carried on sub-carriers not used for either the pilot signals or the control signals within the certain of the plurality of groups of sub-carriers.

40. The system of claim 33 wherein each sub-band is further defined by a frequency hopping pattern of sub-carriers within a given one of the plurality of groups of sub-carriers from one OFDM symbol window to another.

41. The system of claim 40 wherein the frequency hopping pattern is pseudo random.

42. The system of claim 33 wherein each of the plurality of groups of sub-carriers supports a plurality of sub-bands.

43. The system of claim 33 wherein at least one of the sub-bands is defined by a plurality of the sub-carriers during an OFDM symbol window within one of the plurality of OFDM symbol windows.

44. The system of claim 33 wherein the user elements are associated with a group of sub-carriers based on channel conditions.

45. The system of claim 33 wherein a first set of the plurality of groups of sub-carriers is used by adjacent sectors or cells, and a second set of the plurality of groups of sub-carriers is not used by adjacent sectors or cells.

46. The system of claim 45 wherein user elements experiencing poor channel conditions are associated with a sub-band in the second set of the plurality of groups of sub-carriers.

47. The system of claim 45 wherein user elements experiencing good channel conditions are associated with a sub-band in the first set of the plurality of groups of sub-carriers.

48. The system of claim 33 wherein during a handoff from a first access point to a second access point, the user element is associated with a first sub-band for the first access point and a second sub-band for the second access point.

49. A user element for communicating in an orthogonal frequency division multiplexing (OFDM) environment comprising:
  a) circuitry adapted to:
    receive OFDM symbols, the OFDM symbols carrying traffic for the user element in a sub-band defined by a sequence of sub-carriers over a plurality of OFDM symbol windows, the sub-carriers for the sub-band associated with one of a plurality of groups of sub-carriers within an OFDM frequency band;

b) a processor adapted to:

demodulate the OFDM symbols using a Fourier Transform to recover sub-carriers encoded with quadrature-based symbols; and decode the quadrature-based symbols encoded onto the sub-carriers to recover the traffic for the user element.

50. The user element of claim 49 wherein the sub-carriers associated with each of the plurality of groups of sub-carriers are spread over the OFDM frequency band.

51. The user element of claim 49 wherein the sub-carriers associated with each of the plurality of groups of sub-carriers are separated by a constant offset.

52. The user element of claim 51 wherein the constant offset is equal to a number of the plurality of groups.

53. The user element of claim 51 wherein the constant offset is equal to $2^x$ wherein x is an integer.

54. The user element of claim 49 wherein pilot signals and control signals are confined to certain of the plurality of groups of sub-carriers.

55. The user element of claim 49 wherein the traffic is carried on sub-carriers not used for either the pilot signals or the control signals within the certain of the plurality of groups of sub-carriers.

56. The user element of claim 49 wherein each sub-band is further defined by a frequency hopping pattern of sub-carriers within a given one of the plurality of groups of sub-carriers from one OFDM symbol window to another.

57. The user element of claim 56 wherein the frequency hopping pattern is pseudo random.

58. The user element of claim 49 wherein each of the plurality of groups of sub-carriers supports a plurality of sub-bands.

59. The user element of claim 49 wherein at least one of the sub-bands is defined by a plurality of the sub-carriers during an OFDM symbol window within one of the plurality of OFDM symbol windows.

60. The user element of claim 49 wherein the user elements are associated with a group of sub-carriers based on channel conditions.

61. The user element of claim 49 wherein a first set of the plurality of groups of sub-carriers is used by adjacent sectors or cells, and a second set of the plurality of groups of sub-carriers is not used by adjacent sectors or cells.

62. The user element of claim 61 wherein user elements experiencing poor channel conditions are associated with a sub-band in the second set of the plurality of groups of sub-carriers.

63. The user element of claim 61 wherein user elements experiencing good channel conditions are associated with a sub-band in the first set of the plurality of groups of sub-carriers.

64. The user element of claim 49 wherein during a handoff from a first access point to a second access point, the user element is associated with a first sub-band for the first access point and a second sub-band for the second access point.

\* \* \* \* \*